Aug. 15, 1950 V. MOORE 2,518,708
TRANSMISSION AND TORQUEMETER THEREFOR
Filed Jan. 15, 1948 2 Sheets-Sheet 1

INVENTOR
VINCENT MOORE.
BY Victor D. Behr
ATTORNEY

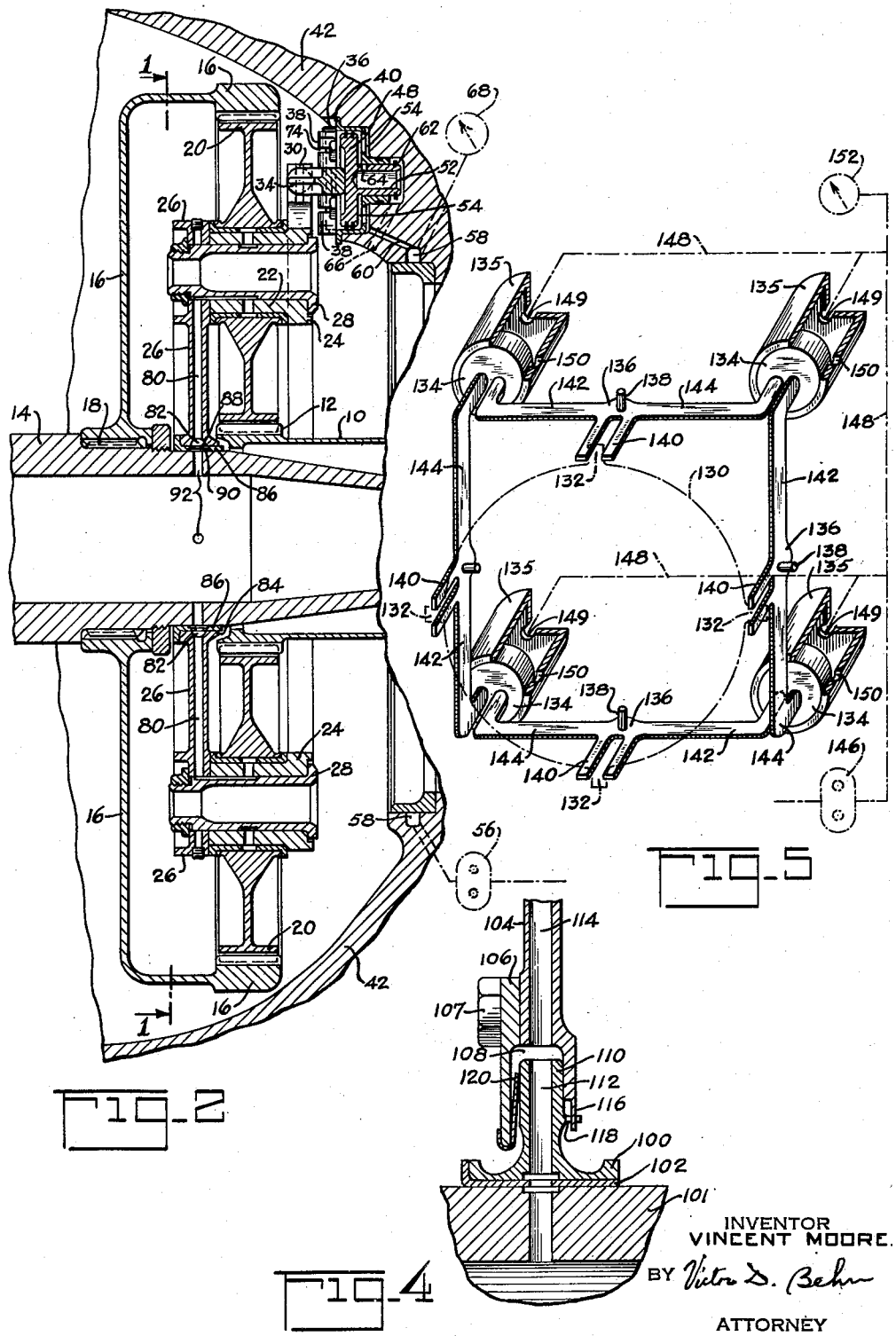

Patented Aug. 15, 1950

2,518,708

UNITED STATES PATENT OFFICE 2,518,708

TRANSMISSION AND TORQUE METER THEREFOR

Vincent Moore, Ridgewood, N. J., assignor to Wright Aeronautical Corporation, a corporation of New York Application January 15, 1948, Serial No. 2,383

13 Claims. (Cl. 74—410)

This invention relates to gear transmissions and is particularly directed to a gear transmission including means for continuously indicating transmission torque and/or to gear transmissions including a plurality of parallel connected pinions which automatically divide the load substantially equally between them.

In a gear transmission having a plurality of parallel connected pinions, it is desirable that the load be divided substantially equally between said pinions. However, because of manufacturing errors—for example in the location of the pinion bearings—it frequently happens that one or more of the pinions tend to carry considerably more than their share of the load. It is an object of this invention to provide a novel transmission, including a plurality of parallel connected pinions rotatable about fixed axes, in which the pinions tend to automatically divide the load substantially equally.

A further object of the invention comprises the provision of a simple and novel torquemeter for a transmission such that the torquemeter introduces no radial or other lateral forces in the transmission. In addition the torquemeter is arranged to permit limited lateral or radial movement of the member whose torque is being measured. With this arrangement, when the member whose torque is being measured comprises a carrier for a plurality of pinions, connected in parallel in the transmission, the lateral freedom of the carrier provides for automatic equalization of the load between said pinions.

Other objects of the invention will become apparent upon reading the annexed detailed description in connection with the drawing in which:

Figure 2 is a sectional view taken along line 2—2 of Figure 1;

Figure 4 is a partial sectional view, generally similar to Figure 2, and illustrating a modified form of the invention; and Figure 5 is a schematic perspective view illustrating a further modification of the invention.

Although the invention has been designed for use with a transmission disposed between an aircraft engine and its propeller, it will be obvious however that the invention is of general application.

Figure 1:
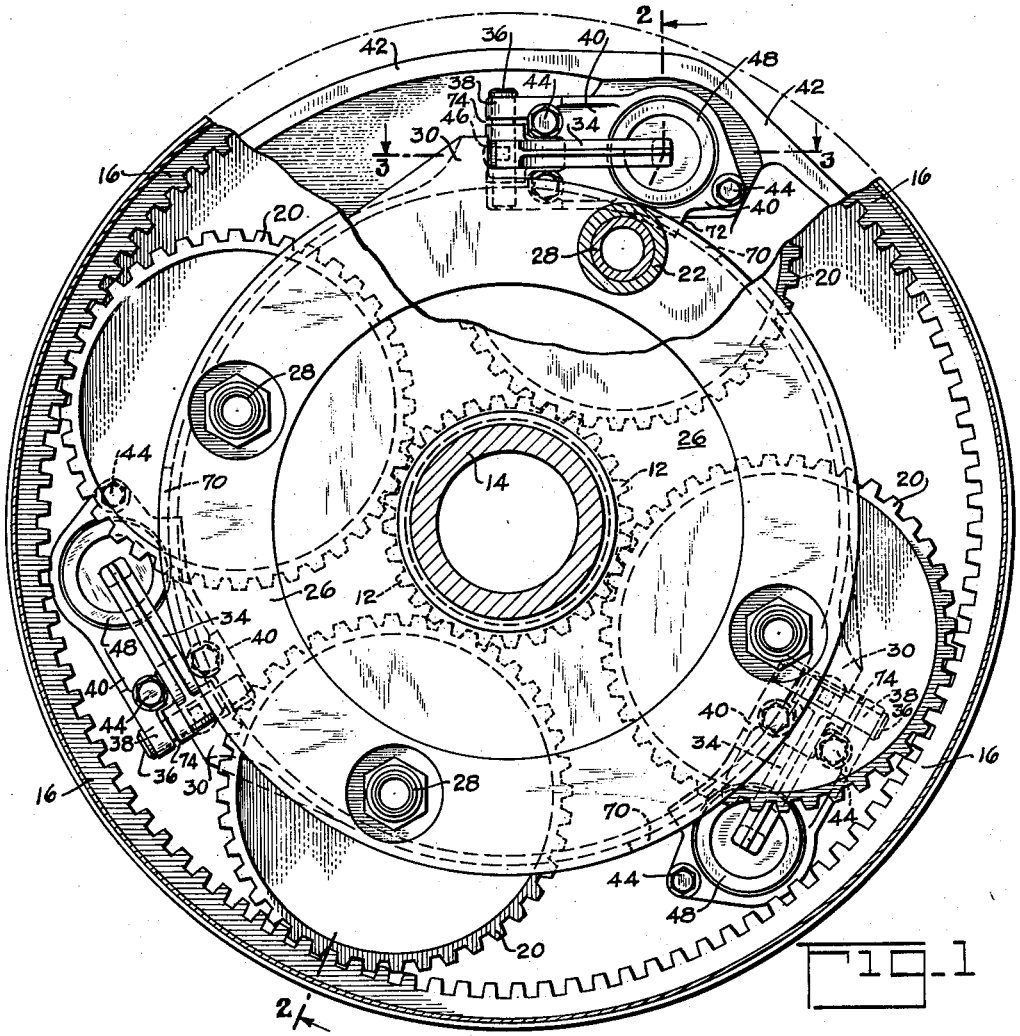
Figure 1 is an end view of a transmission embodying the invention.
Figure 3:
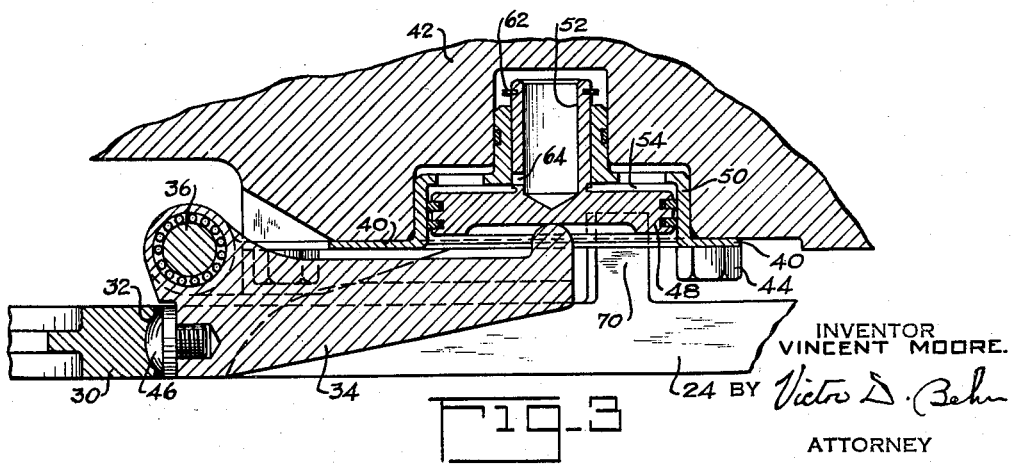
Figure 3 is an enlarged sectional view taken along line 3—3 of Figure 1.

Referring first to Figures 1 to 3 of the drawing, as illustrated the transmission comprises an input shaft 10 having a gear 12 formed integral therewith and an output shaft 14 having an internal annular gear 16 splined to the output shaft 14 at 18. When the transmission is disposed between an aircraft engine and its propeller, the shaft 10 is connected to said engine and the shaft 14 is connected to said propeller. The gears 12 and 16 are concentric and a plurality of pinions 20 are disposed between said gears 12 and 16 in meshing engagement therewith. The pinions 20 are journaled about hollow studs 22 projecting from an annular member 24. The annular member 24 is secured to a second annular member 26 by bolts 28 passing through said hollow studs 22. The composite pinion carrier member 24, 26 is secured against rotation by means hereinafter described. With the structure so far described, the pinions 20 and gears 12 and 16 provide a driving connection from the shaft 10 to the shaft 14 for driving the shaft 14 at a reduced speed.

The annular carrier member 24 is provided with a plurality of symmetrically spaced lugs 30 extending radially from the periphery of said member, three such lugs being illustrated. Each of the lugs 30 has a spherical seat 32 facing tangentially in the same rotative direction about the axis of the carrier member 24. A bell crank lever 34 is pivotally mounted adjacent each lug 30 on a pivot pin 36 carried by spaced bosses 38 formed on a plate 40 secured to the engine housing structure 42 by screws 44. One end of each bell crank lever 34 is provided with a spherical button 46 fitted within the spherical seat 32 of its associated lug 30 while the other end of said lever engages a piston 48 slidable in a cylindrical sleeve 50 formed integral with said plate 40.

Each piston 48 has a reduced diameter hollow stem portion 52 fitted to a correspondingly reduced diameter portion of the cylindrical sleeve 50 thereby forming an annular cylindrical space 54 at the rear side of said piston.

A suitable liquid under pressure is supplied by a pump 56 to each said annular space 54 through an annulus 58 and passages 60. Accordingly each of the pistons 48 is urged outwardly from the cylinders 50 by the liquid pressure in its annular space 54. Outward motion of each piston 48 is limited by a suitable stop ring 62. The stem of each piston 48 is also provided with one or more drain holes or relief ports 64 communicating with the hollow interior of said stem which in turn communicates with a drain passage 66.

The pinion carrier member 24, 26 comprises a torque reaction member of the gear transmission between the shafts 10 and 14. When the transmission input shaft gear 12 is driving and rotating in a clockwise direction (Figure 1) the pinion carrier member 24, 26 is subjected to a clockwise reaction torque. The arrangement is such that clockwise motion of the carrier member 24, 26 is resisted by the pistons 48 through the interposed bell crank levers 34. Accordingly the carrier member 24, 26 assumes a rotative position such that the clockwise torque reaction on the pinion carrier urges the pistons 48 against the liquid pressure acting thereon until the relief ports 64 are covered to such an extent that the torque reaction forces acting on one side of the pistons are balanced by the liquid pressure forces acting on the other sides of said pistons. Any increase in the clockwise driving torque of the shaft 10, results in a slight further closing of at least one of the relief ports 64 until said forces are again balanced. Likewise any decrease in said torque results in a slight opening adjustment of at least one of the relief ports 64 until balance is again restored between the torque reaction force on each piston and the opposing liquid pressure force.

Obviously, since the annulus space 54 behind each piston communicates with the annulus 58, the same liquid pressure acts on each piston and therefore this liquid pressure is a measure of the transmission output torque. Accordingly a liquid pressure responsive indicating device 68 may be connected to the annulus 58 or to any one of the annular spaces 54 for measuring the transmission torque. Also it should be noted that it is only essential for one of the pistons 48 to be provided with a liquid pressure relief port 64. However, for manufacturing reasons, the pistons 48 have all been made the same.

With the aforedescribed structure, the pistons 48 resist rotation of the pinion carrier member 24, 26 in a clockwise direction (Figure 1) and the liquid pressure acting on said pistons is a measure of the clockwise torque acting on said member. The carrier member 24 is also provided with axially extending lugs 70 adapted to engage shoulders 72 on the plates 40 to prevent rotation of said carrier member in the reverse or counterclockwise direction.

As stated, the same liquid pressure acts on each piston 48 and therefore the same tangential force is exerted on each lug 30 on the pinion carrier member 24, 26. In addition said lugs 30 are symmetrically disposed about the axis of said gear member. Therefore, the torque measuring forces subject the carrier member 24, 26 to only pure torque.

The pivot pin 36 of each bell crank lever 34 is substantially radially disposed. In addition each said lever is provided with some clearance 74 between it and its associated pivot pin supporting bosses 38 thereby permitting limited movement of each bell crank lever 34 along its pivot pin 36. With this arrangement the pinion carrier member 24, 26 is free to shift radially or laterally a limited extent relative to the axes of its input gear 12 and the axes of its output gear 16.

Since the tangential reaction forces acting on the lugs 30 of the pinion carrier member 24 subjects said member only to pure torque, the bell crank levers 34 provide no radial restraint to the position of said pinion carrier member, within the limits of movement of said levers between their pivot pin supporting bosses 38, except for the small frictional restraint to movement of said levers along their respective pivot pins 36. Accordingly the pinion carrier member 24, 26 floats between the gears 12 and 16 whereby if one of the pinions 20 tends to assume more than its share of the load, the pinion carrier member will shift laterally until the load is substantially equally divided between all the pinions.

As illustrated, the two arms of each bell crank lever 34 are of unequal length such that the range of motion of the carrier member lugs 30 is substantially less than that of the pistons 48. With this arrangement, the motion of the carrier member about the transmission axis can be kept quite small and still provide ample movement of the pistons 48 for controlling the liquid pressure acting thereon. In an actual installation, the range of movement of the pistons 48, between no load and full load torque, is of the order of a small fraction of an inch, so that the carrier member 24, 26 has no appreciable motion about the transmission axis.

With the pivot pins 36 disposed radially, the inter-locking engagement of the spherical buttons 46 with the spherical seats 32 locates the carrier member 24, 26 axially in spite of the freedom of movement of each bell crank lever along its pivot pin 36. The small pivotal movement of the bell crank levers 34 between no load and full load torque has no appreciable affect on the axial position of the pinion carrier member 24, 26 because the bell crank lever arms, engaging the spherical seats 32, are disposed substantially at right angles to the path of motion of their respective seats 32. Also, as a result of the radial disposition of the pivot pins 36, the axes of the pistons 48 are spaced from and are disposed parallel to the axis of the transmission. Accordingly said pistons can be conveniently disposed about either the input shaft 10 or the output shaft 14 of the transmission, thereby providing a very compact arrangement.

In order to provide lubrication of the bearing surfaces of the pinions 20, the carrier member 26 is provided with passages 80 each communicating at one end with the bearing surfaces of one of said pinions and at its other end with an internal annular groove 82 on the hub portion of said carrier member. An oil transfer bushing 86 is disposed between said hub portion and the hollow shaft 14. The oil transfer bushing 86 is provided with radial holes 88 communicating at one end with said annular groove 82 and at their other ends with an internal annular groove 90 in said bushing. The shaft 14 is also provided with radial holes 92 communicating with the annular groove 90 in said bushing. With this arrangement, lubricating oil is supplied to the bearing surfaces of the pinions 20 from the interior of the shaft 14 via holes 92, annular groove 90, holes 88, annular groove 82 and passages 80.

The provision of the oil transfer bushing 86 limits the range of free floating movement of the pinion carrier member 24, 26 relative to the internal gear 16, to the thickness of the oil film between said bushing and the shaft 14. In general, however, a larger range of radial floating movement of the pinion carrier is preferable, as is provided by the oil transfer sleeve construction of Figure 4.

The gear transmission of Figure 4 is intended to be similar to that of Figures 1-3, except for the means for supplying oil to the pinion carrier member, so that only this latter means is illustrated. In Figure 4, an oil transfer sleeve 100 and bushing 102 are disposed about a shaft-like member 101. An annular pinion carrier member 104 (corresponding to the member 26 of Figure 2) has an annular side plate 106 secured thereto at its hub by screws 107 to form an annular groove 108 within which an annular flange 110 on the oil transfer sleeve 100 is received. The sleeve 100 is provided with radial passages 112 to which oil is supplied from the interior of the shaft-like member 101 through the oil transfer bushing 102 in much the same manner that oil is supplied to the passages 80 of Figure 2. From the sleeve passages 112, the oil enters the annulus 108 from which it is supplied to the bearing surfaces of the pinions 20 through passages 114 in the pinion carrier member 104. The oil transfer sleeve 100 and pinion carrier member 104 are locked against relative rotation by interfitted tabs 116 and 118. In addition an angular spring 120, secured to the plate 106, urges the flange 110 against one side of the channel 108 to prevent leakage of lubricating oil therebetween and at the same time the spring 120, by reason of its annular construction, prevents leakage of lubricating oil between the outer side of the channel 108 and the flange 110. The annular telescopic fit between the pinion carrier member 104 and the oil transfer sleeve flange 110 comprises a flexible connection therebetween permitting said carrier member to move radially and laterally relative to the shaft-like member 101 and the transmission gears without disturbing the transfer of lubricating oil from said shaft-like member to the pinion carrier member 104.

In Figure 4, the pinions are lubricated by oil supplied to their carrier member 104 from the shaft-like member 101. Like the shaft 14 of Figures 1-3, the member 101 may comprise the output shaft of the transmission or it may comprise a stationary member. Except for its small radial or lateral floating movement and its small rotary movements, the pinion carrier member 26 or 104 is stationary so that oil may readily be supplied thereto from any stationary member by a flexible connection permitting said small relative movements, as for example by a flexible conduit.

In the structure so far described, the torquemeter indicates the engine output torque only when the torque reaction on the pinion carrier member is in one rotative direction (clockwise in Figure 1). When the direction of this reaction torque reverses, it is resisted by the engagement of the flange or flanges 70 with the stop shoulder or shoulders 72 so that there is no measurement of the magnitude of this reverse torque. However, in the case of an aircraft engine drivably connected to a bladed propeller for providing the aircraft with forward thrust, it is common practice to also use the propeller for providing reverse thrust in order to brake the forward motion of the aircraft. Accordingly in certain aircraft installations, it may be desirable—for example for control purposes—to measure the torque during reverse thrust operation of the aircraft propeller as well as during its forward thrust operation. Figure 5 diagrammatically illustrates a novel arrangement for this purpose.

In Figure 5, a pinion carrier member 130 for a gear transmission, is schematically indicated in the dot and dash outline, said transmission being similar to that of Figures 1-4. The carrier member 130 is provided with an even number of symmetrically spaced lugs 132 extending radially outwardly from its periphery, four such lugs being indicated on the drawing. The structure of the carrier member 130, except for the structure of its lugs 132, may be similar to the carrier member 24, 26 of Figures 1 to 4. An even number of pistons 134, equal to the number of lugs 132, are symmetrically disposed about the axis of the carrier member 130, midway between the lugs 132, each piston being slidable in a fixed cylinder 135. In addition a plurality of levers 136 are provided, each of said levers being pivotally mounted about a pivot pin 138 disposed radially relative to the axis of the carrier member 130 and adjacent one of the lugs 132. Each said lever 136 is provided with a forked extension 140 straddling its adjacent lug 132 and one arm 142 of each lever is adapted to engage one of the adjacent pistons 134 and the other arm 144 of each lever is adapted to engage the other adjacent piston, the arms 142 and 144 being of equal length. A suitable liquid under pressure is supplied by a pump 146 to the rear side of each piston 134 through a conduit 148 and a passage 149 extending through the rear wall of each cylinder 135. The magnitude of this pressure is controlled by one or more drain holes 150, each controlled by a piston 134.

With this arrangement of Figure 5, clockwise torque acting on the pinion carrier member 130 is resisted through engagement of the lever arms 144 with the pistons 134. Similarly counterclockwise torque acting on the carrier member 130 is resisted through engagement of the lever arms 142 with the pistons 134. In each case, the pistons 134 assume a position in which the liquid pressure acting thereon balances the torque reaction on the carrier member 130. Accordingly the liquid pressure acting on the pistons 134 is a measure of the reaction torque on the pinion carrier member 130 regardless of the direction of said torque. A pressure responsive indicating device 152 is connected to the conduits 148 to indicate the magnitude of the reaction torque acting on the pinion carrier member 130, which torque is proportional to the output torque of the transmission.

In Figure 5, the levers 136 are only schematically illustrated. However, said levers are preferably slidable along the axes of their respective pivot pins 138 and each side of their forked ends 140 preferably has a spherical connection with a pinion carrier member lug 132 similar to that provided by each spherical button 46 and its socket 32 of Figures 1 to 3.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications.

I claim as my invention:

1. In combination with a transmission comprising an input member, an output member, and a reaction member: a plurality of pistons symmetrically spaced about the axis of said reaction member; a plurality of support members each having a cylindrical bore within which one of said pistons is slidable; means for supplying liquid under pressure to said cylindrical bores for application against their respective pistons; a lever interconnecting each piston with said reaction member such that torque on said reaction member is resisted by the liquid pressure applied against said pistons; each of said levers being pivotally mounted on one of said support members.

2. In a transmission: a first gear; a second gear concentric with said first gear; a carrier member concentric with said gears; a plurality of pinions mounted on said carrier member and disposed in meshing engagement with said gears for providing a driving connection therebetween; means for providing a supply of oil; a flexible connection between said means and said carrier member for supplying oil to said carrier member while permitting radial movement of said carrier member relative to said gears.

3. In a transmission: a first gear; a second gear concentric with said first gear; a carrier member concentric with said gears; a plurality of pinions mounted on said carrier member and disposed in meshing engagement with said gears for providing a driving connection therebetween; an annular member; said annular member and carrier member having passages for supplying lubricating oil from said annular member through said passages to bearing surfaces of said pinions, said annular member and said carrier member also having annular telescopic portions permitting relative radial movement between said members without interrupting the supply of lubricating oil to said pinion bearing surfaces.

4. In a transmission: a first gear; a second gear concentric with said first gear; a carrier member concentric with said gears; a plurality of pinions mounted on said carrier member and disposed in meshing engagement with said gears for providing a driving connection therebetween; an annular member; said annular member and carrier member having passages for supplying lubricating oil from said annular member through said passages to bearing surfaces of said pinions; said annular member and said carrier member also having annular telescopic portions permitting relative radial movement between said members without interrupting the supply of lubricating oil to said pinion bearing surfaces; a plurality of pistons symmetrically spaced about the axis of said carrier member; means for supplying liquid under pressure against said pistons; and means operatively interconnecting said reaction member and pistons so that reaction member torque is resisted by liquid pressure on said pistons.

5. A transmission as described in claim 4 including valve port means controlled by at least one of said pistons for regulating said liquid pressure.

6. A transmission as recited in claim 4 in which the connection between each said piston and said reaction member comprises a lever having its ends respectively abutting said piston and reaction member, each said lever being mounted for pivotal movement about an axis disposed substantially radial relative to the axis of said reaction member and being mounted for limited movement along its pivot axis.

7. In combination with a transmission comprising an input member, an output member and a torque reaction member: a plurality of pistons; a plurality of levers operatively connecting said reaction member to said pistons; each of said levers having a first arm engageable with one piston and a second arm engageable with a second piston so that reaction member torque in one direction is transmitted to said pistons through the first arms of said levers and reverse reaction member torque is transmitted to said pistons through the second arms of said levers; and means for supplying liquid under pressure against said pistons for resisting said torques.

8. A transmission comprising an input member; an output member; a reaction member; an annular gear on one of said members; an annular gear on another of said members concentric with said first-mentioned gear; a plurality of pinions on the remaining one of said members meshing with said annular gears; a plurality of pistons symmetrically spaced about the axis of said reaction member; means for supplying a fluid under equal pressure against said pistons; and means operatively connecting said reaction member to said pistons so that reaction member torque is resisted by the fluid pressure acting against said pistons, the connection between each said piston and said reaction member comprising a lever having its ends respectively abutting said piston and reaction member, the pivot axes of said levers being disposed substantially radial relative to the axis of said reaction member and the piston axes being disposed parallel to but spaced from the reaction member axis.

9. A transmission comprising an input member; an output member; a reaction member; an annular gear on one of said members; an annular gear on another of said members concentric with said first-mentioned gear; a plurality of pinions on the remaining one of said members meshing with said annular gears; a plurality of pistons symmetrically spaced about the axis of said reaction member; means for supplying a fluid under equal pressure against said pistons; and means operatively connecting said reaction member to said pistons so that reaction member torque is resisted by the fluid pressure acting against said pistons, the connection between each said piston and said reaction member including a lever which is yieldable radially relative to the axis of said reaction member.

10. A transmission as recited in claim 9 in which the connection between each said piston and said carrier member comprises a lever having its ends respectively abutting said piston and carrier member, each said lever being mounted for pivotal movement about an axis disposed substantially radial relative to the axis of said reaction member and being mounted for limited movement along its pivot axis.

11. A transmission comprising a first gear; a second gear concentric with said first gear; a carrier member concentric with said gears; a plurality of pinions mounted on said carrier member and disposed in meshing engagement with said gear for providing a driving connection therebetween; a plurality of pistons substantially symmetrically spaced about the axis of said gears, means for supplying a fluid under equal pressure against said pistons; and means operatively connecting said carrier member to said pistons so that the torque reaction on said carrier member, resulting from transmission of torque from said first gear to said second gear, is resisted by the fluid pressure acting on said pistons, the connection between each said piston and said carrier member comprising a lever having its ends respectively abutting said piston and carrier member, the pivot axes of said levers being disposed substantially radial relative to the axis of said carrier member and the piston axes being disposed parallel to but spaced from the reaction member axis.

12. A transmission comprising a first gear; a second gear concentric with said first gear; a carrier member concentric with said gears; a plurality of pinions mounted on said carrier member and disposed in meshing engagement with said gear for providing a driving connection therebetween; a plurality of pistons substantially symmetrically spaced about the axis of said gears, means for supplying a fluid under equal pressure against said pistons; and means operatively connecting said carrier member to said pistons so that the torque reaction on said carrier member, resulting from transmission of torque from said first gear to said second gear, is resisted by the fluid pressure acting on said pistons, the connection between each said piston and said carrier member comprising a lever which is yieldable radially relative to the axis of said carrier member.

13. A transmission comprising an input member; an output member; a reaction member; an annular gear on one of said members; an annular gear on another of said members concentric with said first-mentioned gear; a plurality of pinions on the remaining one of said members meshing with said annular gears; a plurality of pistons symmetrically spaced about the axis of said reaction member; means for supplying a fluid under pressure against said pistons; and means operatively connecting said reaction member to said pistons so that reaction member torque is resisted by the fluid pressure acting against said pistons, the connection between each said piston and said reaction member comprising a lever having its ends respectively abutting said piston and said reaction member, each said lever being mounted for pivotal movement about an axis disposed substantially radial relative to the axis of said reaction member and being mounted for limited movement along its pivot axis to permit radial movement of said reaction member relative to at least one of said annular gears.

VINCENT MOORE.

REFERENCES CITED

The following references are of record in the file of this patent:

UNITED STATES PATENTS

| Number | Name | Date |
|---|---|---|
| 505,396 | Esmond | Sept. 19, 1893 |
| 1,864,348 | Given | June 21, 1932 |
| 2,154,489 | Buck | Apr. 18, 1939 |
| 2,182,789 | Cotanch | Dec. 12, 1939 |
| 2,225,863 | Halford et al. | Dec. 24, 1940 |
| 2,231,784 | Van Thungen | Feb. 11, 1941 |
| 2,346,168 | Jones | Apr. 11, 1944 |
| 2,386,367 | Taylor | Oct. 9, 1945 |
| 2,444,363 | Newcomb | June 29, 1948 |